Nov. 2, 1954 W. ELLERMANN 2,693,348
CONTINUOUSLY OPERATING SCREW PRESS FOR PLASTIC COMPOSITIONS
Filed Oct. 12, 1953 2 Sheets-Sheet 1

INVENTOR
WILHELM ELLERMANN
ATTORNEY

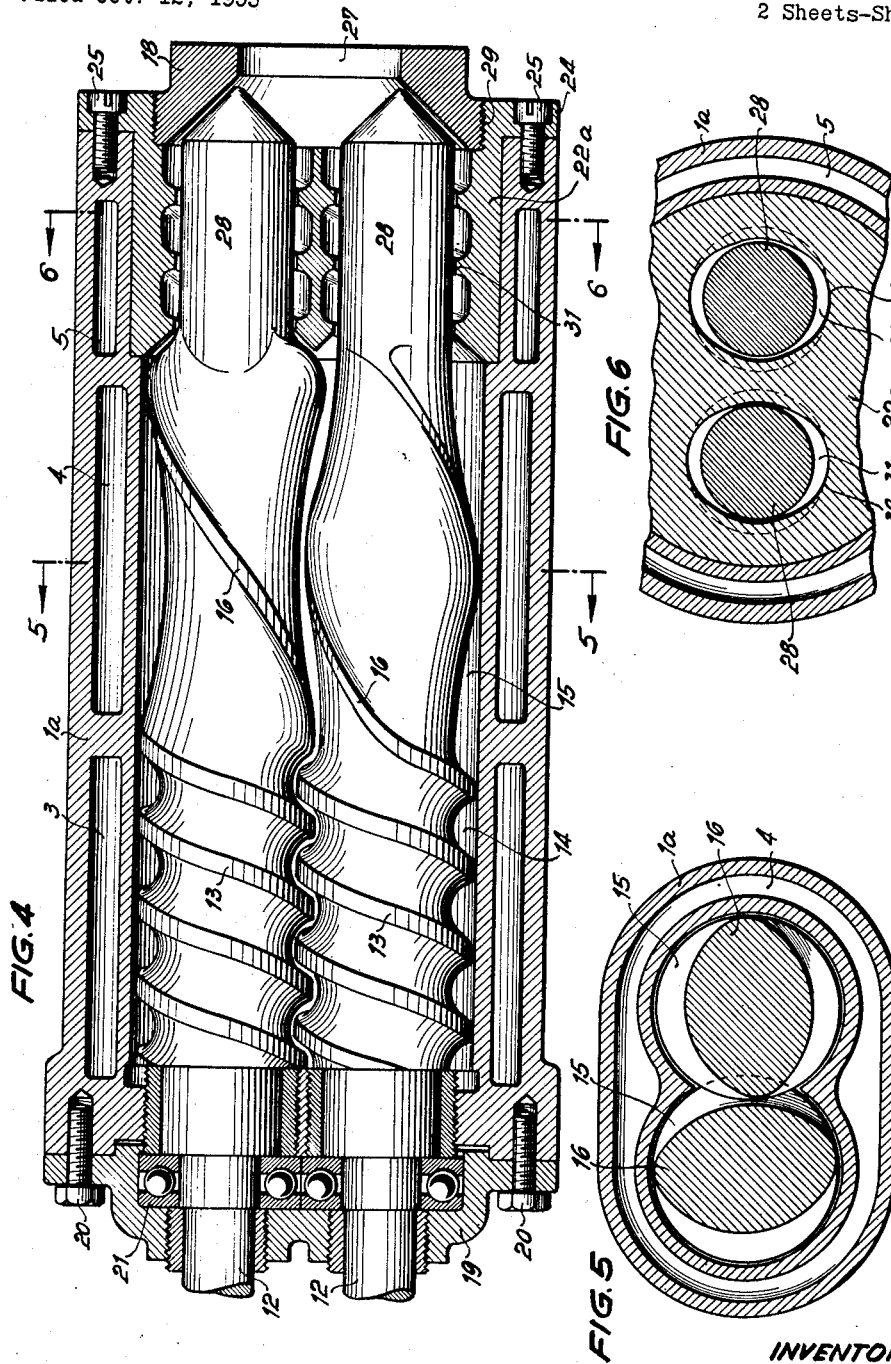

United States Patent Office 2,693,348
Patented Nov. 2, 1954

2,693,348
CONTINUOUSLY OPERATING SCREW PRESS FOR PLASTIC COMPOSITIONS

Wilhelm Ellermann, Dusseldorf-Oberkassel, Germany, assignor to Joseph Eck & Sohne, Dusseldorf-Heerdt, Germany, a corporation of Germany Application October 12, 1953, Serial No. 385,645

Claims priority, application Germany July 30, 1953

3 Claims. (Cl. 259—41)

The present invention relates to a screw press for the continuous treatment of plastic organic substances and in particular of thermoplastic substances, which press is equipped with one or several screws disposed in a common housing, the latter containing between the front and rear portions of the screw or screws a kneading space.

In such screw presses the output and the kneading and mixing effect depend substantially upon the pitch of the screw and the velocity at which the screw or screws revolve. Depending upon the material to be treated a more or less strong kneading effect is required.

It is a particular drawback of the known screw presses that a change of the kneading effect can be achieved only by exchanging the kneading shaft carrying the screw against another one of different feeding volume on the output side. This step is not only troublesome and complicated, but requires also a greater stock of different screws for all possible situations, which is rather not economical. It is also known that screw shafts are very expensive and are made always of non-corroding and non-wearing refined steel. Furthermore, the working of the screw shaft requires high-paid labor. Finally the change of the shaft is time consuming and brings about a comparatively long period in which the machine is out of operation.

It has been attempted to change the kneading and mixing effect by changing the number of revolutions of the shaft or shafts, without, however, bringing satisfactory results. The substances remain, when such means are used, in the kneading chamber for a longer or shorter period, yet the kneading and mixing effect is not improved to the extent as expected, since the kneading tools operate likewise slower or faster with the result that the kneading effect is either too weak or too strong.

It is, therefore, one object of the present invention to provide a screw press which avoids the inherent drawbacks of the known screw presses.

It is another object of the present invention to provide a screw press which includes at its output side an exchangeable hollow box in the inner face of which the thread of the screw is cut in, which thread in combination with the rear portion of the shaft or shafts of the screw feeds the material from the kneading space into the output head of the machine, the rear portion of the shaft or shafts of the screw being surrounded by the said box.

The structure of the present invention brings about the advantage that by mere changing of the screw box to one with different feeding volume the treatment of the material is appreciably improved without changing the number of revolutions of the shaft or shafts of the screw and also to assure a completely homogeneous final product which is free from all objections.

There is the further advantage that the change of the boxes may be achieved in appreciably shorter time than the change of the kneading shafts, thereby reducing the period of inoperativeness of the machine.

The provision of a series of exchangeable boxes is also much more economical than a plurality of kneading shafts, since a single set of kneading shafts is normally sufficient. The application of the present device is universal, which amounts to a great simplification for the working process.

With these and other objects in view which will become apparent in the following detailed description, the present invention will be clearly understood in connection with the accompanying drawings, in which:

Fig. 4 is an axial section through a second embodiment of the screw press having two screw shafts;

Fig. 5 is a section along the lines 5—5 of Fig. 4; and

Fig. 6 is a fragmentary section along the lines 6—6 of Fig. 4.

Figure 1:
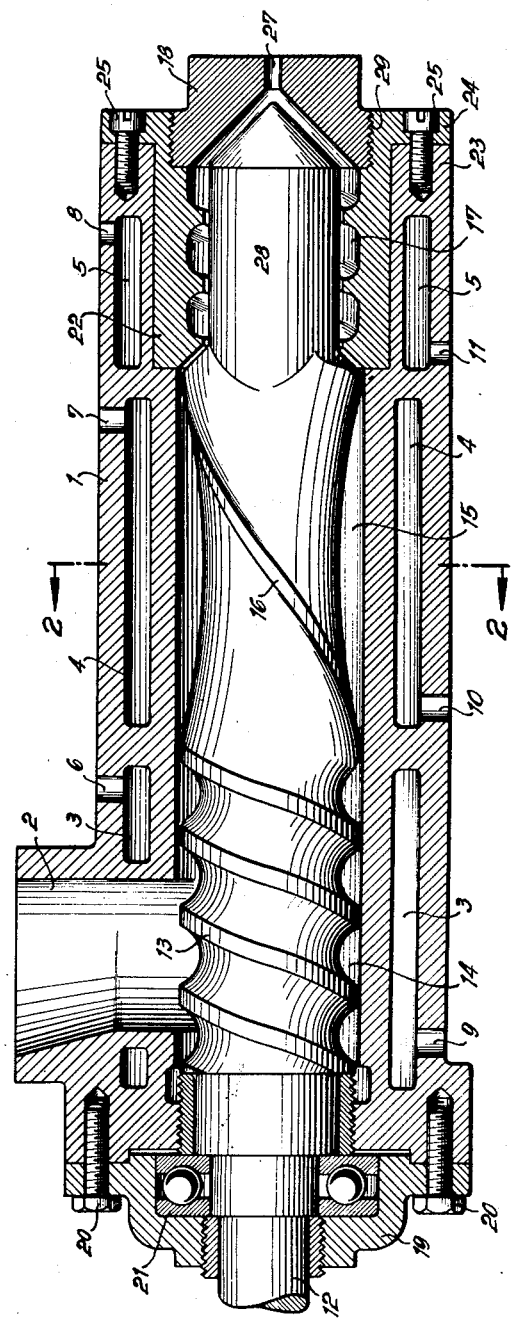
Figure 1 is an axial section through a screw press with a screw shaft.
Figure 3:
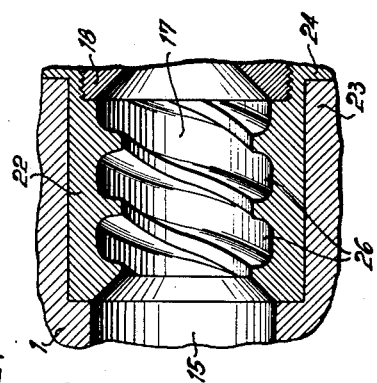
Fig. 3 is a sectional view through the box with the screw threads in the inner face of the box.
Figure 2:
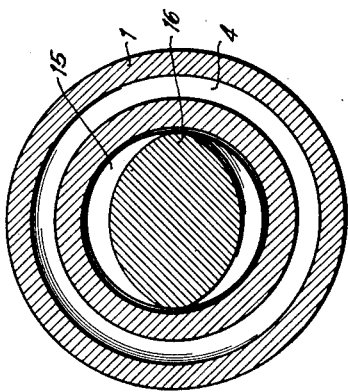
Fig. 2 is a section along the lines 2—2 of Fig. 1.

Referring now to the drawings and particularly to Figs. 1 to 3, the screw press comprises a cylindrical housing 1 which is formed to a hopper 2 and which is equipped with three annular chambers 3, 4, and 5. These chambers serve the purpose of feeding a liquid heating or cooling medium therethrough, which medium enters through the respective openings 6, 7 and 8 and escapes through the respective openings 9, 10 and 11. In this manner it is possible to heat or cool the three distinct sections of the housing 1 individually in accordance with the requirements for treating the material. The first section of the housing contains the chamber 14 in which the portion of the kneading shaft 12 carrying the screw threads 13 is disposed. The second section of the housing 1 contains the kneading chamber 15 in which the kneading shaft 12 is formed in known manner as a kneading machine 16. The third section of the housing 1 contains the output chamber 17 in which the material is fed from the kneading chamber 15 to the mouth piece 18.

The housing 1 is closed up at its entrance side by a flange-like cover 19 which is secured to the front face of the housing 1 by means of screw bolts 20 and which provides a support for the kneading shaft 12 which runs in a ball bearing 21 disposed in the cover 19.

In accordance with the present invention there is provided at the output side of the press a box 22 which finds its seat in the end portion 23 of the housing 1 which has a slightly enlarged bore. The box 22 is equipped with an end flange 24 which serves the purpose to secure the box 22 to the end face of the housing 1 by means of screw bolts 25.

The bore of the box 22 forms the above mentioned output chamber 17 in which the material is fed from the kneading chamber 15 to the mouth piece 18. The inner face of the box has cut therein for this purpose screw threads 26 (Fig. 3), the head circle of which encloses tightly the cylindrical portion 28 of the kneading shaft 12.

The mouth piece 18 which has an output bore 27 carries an outer thread 29 in order to screw the mouth piece 18 into the inner thread of the bore of the box 22. In this manner the mouth piece 18 may be replaced by other mouth pieces of different structure.

Referring now again to the drawings and in particular to Figs. 4 to 6, the embodiment shown in Fig. 4 is distinguished over the first described embodiment merely by the fact that the housing 1a is equipped to receive two kneading shafts 12 in a known manner. In this case the box 22a has two bores 30 each of which carries inner thread 31 which engages the rear straight cylindrical portions 28 of the kneading shafts. This second embodiment is otherwise identical in principle with the first embodiment, disclosed in Fig. 1. As clearly shown in Fig. 5, the housing 1a is of oval cross-section in which the kneading bodies 16 rotate in known manner.

It is to be understood, however, that the kneading bodies 16 may assume any suitable form other than the oval form. The kneading shafts 12 may turn in the same direction or in opposite directions. Their threads may mesh or they may engage each other merely at their head circles, whereby such changes in the structure do not take the present device out of the scope of the present invention.

The devices disclosed in the drawings operate in the same manner as the known presses.

While I have disclosed two embodiments of the present invention, it is to be understood that these embodiments are given by example only and not in a limiting sense,

I claim:
1. A continuously operating screw press for organic plastic substances particularly for thermoplastic substances comprising a housing, at least one screw shaft rotatably mounted in and extending through the said housing, the latter defining a kneading chamber between the front and rear portions of the said screw shaft, a box exchangeably secured to the output side of the said housing and forming the end portion thereof, the portion of the said screw shaft disposed in the said box being cylindrical, the inner face of the said box carrying a thread tightly enclosing the said cylindrical portion of the said screw shaft, a mouth piece disposed at the output end of the said box, the said thread of the said box combined with the said cylindrical portion of the said screw shaft feeding the said substances from the said kneading chamber into the said mouth piece.

2. The screw press, as set forth in claim 1, in which the said box has a bore carrying inner thread at the output end thereof and the said mouth piece carrying complementary outer thread adapted to screw the said mouth piece into the said box and to permit the exchange of different types of mouth pieces.

3. A continuously operating screw press for organic plastic substances particularly for thermoplastic substances comprising a housing, two screw shafts rotatably mounted in parallel arrangement and extending through the said housing, the latter defining a kneading chamber between the front and rear portions of the said screw shafts, a box exchangeably secured to the output side of the said housing and forming the end portion thereof, the portion of the said screw shafts disposed in the said box being cylindrical, the said box having two parallelly disposed bores, the inner face of each of the said bores carrying thread tightly enclosing the said corresponding cylindrical portions of the said respective screw shafts, and a mouth piece disposed at the output end of the said box, the said threads of the said box combined with the said cylindrical portion of the said screw shafts feeding the said substances from the said kneading chamber into the said mouth piece.

References Cited in the file of this patent

UNITED STATES PATENTS

| Number | Name | Date |
|---|---|---|
| 1,904,884 | Royle | Apr. 18, 1933 |
| 2,431,274 | Osborne | Nov. 18, 1947 |
| 2,631,016 | Laubarede | Mar. 10, 1953 |

FOREIGN PATENTS

| Number | Country | Date |
|---|---|---|
| 678,785 | Great Britain | Sept. 10, 1952 |
| 902,848 | France | Sept. 13, 1945 |